Figure 1:
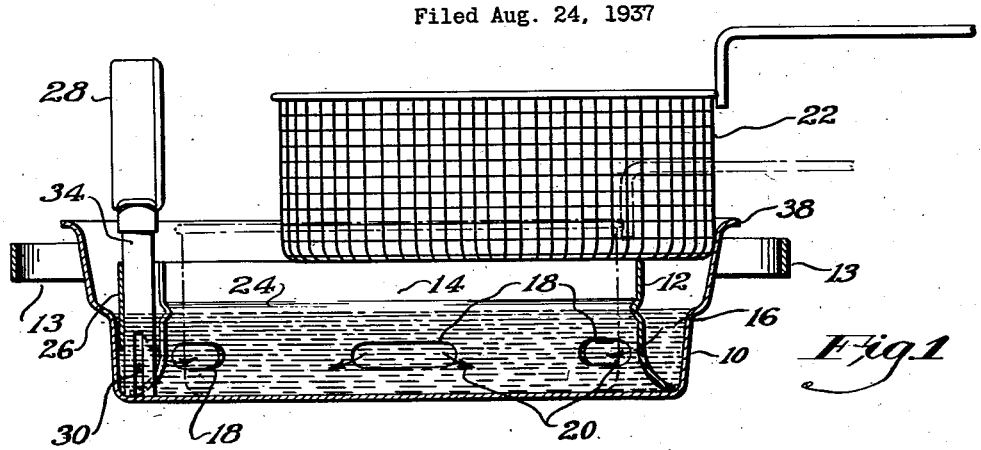

Oct. 29, 1940.　　　K. L. CHILDS　　　2,219,950
FRYING APPARATUS
Filed Aug. 24, 1937

Witness
Jas. J. Maloney

Inventor
Kenneth L. Childs
by his attorneys
Fish Richardson Curry Murray

Patented Oct. 29, 1940

2,219,950

UNITED STATES PATENT OFFICE 2,219,950

FRYING APPARATUS

Kenneth L. Childs, New Haven, Conn.

Application August 24, 1937, Serial No. 160,615

12 Claims. (Cl. 53—7)

The present invention relates to frying apparatus, and more particularly to improvements in kettles or pans of the type disclosed in inventor's pending application for U. S. Letters Patent, Serial No. 129,860 filed March 9, 1937, for holding a substantial supply of highly heated fat or oil in which unheated water-containing foods or other articles are immersed.

As is well known, fat in itself is a poor heat conductor, and heats cold articles of food immersed therein more quickly when strong convection or other induced currents are present. Consequently, it is common to agitate food or move it continuously while being cooked with deep fat methods. Where a shallow kettle is used, there is less opportunity for agitation and strong convection currents as a result of heating the kettle than in a larger kettle. Immersing food in a shallow kettle, therefore, may cause such a sudden decrease of temperature in the fat contacting the food that an improper cooking operation will result, it being necessary to maintain the temperature of the fat in contact with the food above 300 degrees Fahrenheit for the best results.

In the preparation of food by deep fat frying, the food is preferably exposed in a shallow single layer without contact between the elemental articles of food, as is caused by piling one article on another. Frequently a kettle much deeper than required to immerse the food being fried is provided so that a large quantity of fat may be used, although only the upper portion of fat contacts the food. The fat in the lower part of the kettle is employed as a reserve in which is stored an additional supply of heated fat brought into contact with the food after the upper heavier portion cooled by the frying operation causes the hot supply to be displaced into contact with the food. The lower portions of the fat also assist in producing stronger convection currents in the fat than would occur in a shallow kettle. If a relatively small quantity of fat sufficient only to cover the food is used, there ordinarily is no provision for heat storage or convection currents, and as a result, irregular and uneven frying operations take place.

The object of the present invention is to provide frying apparatus having a relatively shallow kettle or pan of a depth sufficient only to immerse a single layer of food, in which the difficulties above enumerated will be avoided and in which the foam will not overflow the sides of the kettle or pan. A further object of the invention is to provide means for controlling the temperature of a small shallow supply of fat within a frying kettle or pan to cause it to be kept at a more uniform temperature than heretofore.

With these and other objects in view, the present invention contemplates the provision in a frying kettle or pan of a rim around the frying zone so spaced from the sides of the kettle as to separate from the fat within the frying zone a proportion of fat sufficient to form a reserve heated supply and so arranged with openings below the fat level that heated fat will be conducted at the proper time from the channel directly against the food being treated within the frying zone during the continued frying operation, thus rendering agitation of the food unnecessary. As herein illustrated, the size of the openings through which the fat is caused to flow is so restricted that too rapid mixture is prevented between the fat in the frying zone and the fat within the channel when the food is first immersed. As a result, a portion of fat less than the contents of the kettle is cooled, and more quickly reheated by the gas flame or other heating means for the kettle than otherwise would be possible by the restricted convection currents of such a shallow kettle.

In the form of this feature, as hereinafter described, the upper edge of the rim is well below the level to which foam rises during normal frying operations so that overflowing foam causes the stored supply of fat to be increased and later rendered available after the level of fat in the frying zone is lowered as the foaming action subsides. Other features of the invention, including certain details of construction and combinations of parts, are hereinafter described in the following detailed specification, and more particularly pointed out in the appended claims.

Figures 2, 3:
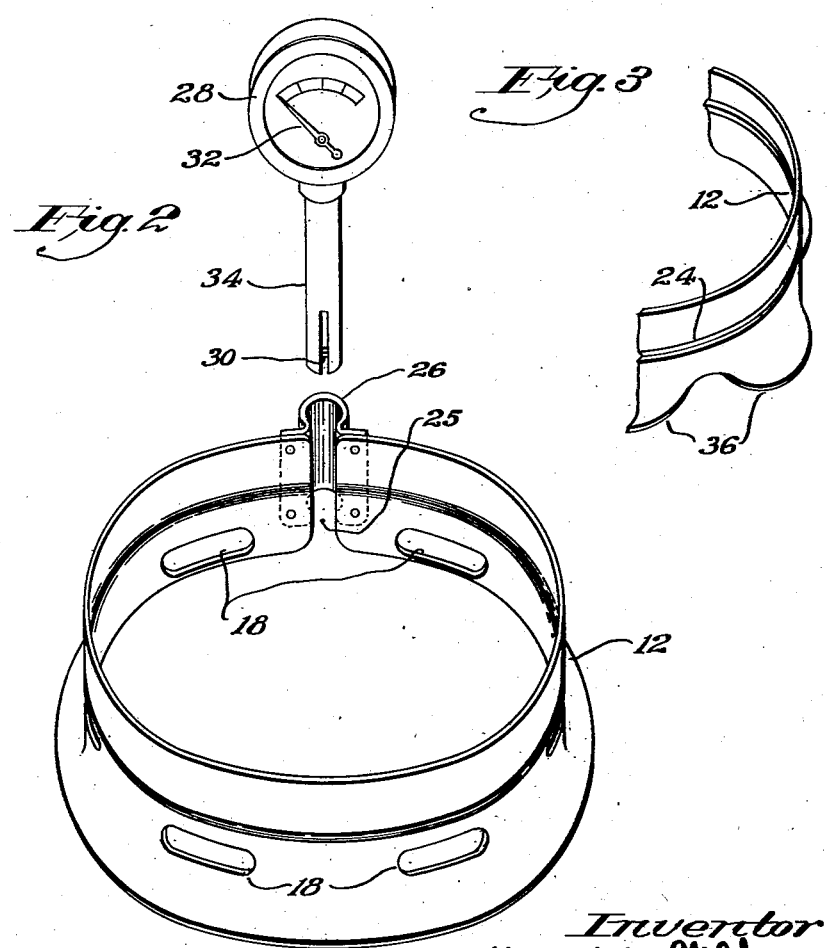

In the drawing Figure 1 is a view in vertical section of an apparatus embodying the features of the present invention; Figure 2 is a perspective view of the separating rim of the invention and a thermometer in position about to be inserted within a holder on the rim; and Figure 3 is a perspective view of a portion of the rim embodying a variation of the invention.

The apparatus illustrated in the drawing is a relatively small complete unit having a kettle or pan for frying small portions or single orders of food arranged in a single layer by immersing the food beneath the surface of the fat or oil raised to a moderately high temperature. When food, such as potatoes, is first immersed, a certain amount of fat or oil is displaced, causing the level of fat to be raised, and the outer surface of the food is seared by the fat, which is ordinarily raised to a temperature of at least 360 degrees Fahrenheit. A few seconds after immersing the food, the heat begins to penetrate the food, driving off a substantial proportion of water contained therein, and the steam rises in the fat, causing a collection of foam at the top. This foaming action reaches a maximum and within a short time subsides almost completely. During the period in which the foam rises, the level of the fat is raised still higher, due to the volume of steam thrown off and thereafter, as the maximum foam subsides, the level of the fat is again somewhat lowered. For successful frying, it is desirable to have the fat heated to a high temperature when the food is first immersed and to be maintained at a high temperature until after the foaming operation is over, so that the outer surfaces of the food will be seared, without permitting the fat to be absorbed. With prior frying kettles, the quantity of reserve fat or oil below the zone at which frying takes place is made sufficient to maintain the temperature of the fat by stored heat throughout this period. In the kettle illustrating the present invention, a reserve supply is maintained at the side of the frying zone and a rim is provided for separating the frying zone from a reserve heat storage channel at one side so that only the fat in the frying zone is cooled in frying, the fat in the storage channel being kept separate until after the foam subsides. By this construction the shallow layer of fat in the kettle is so spread out that it may be heated more quickly than with a deeper kettle. The rim extends from the bottom of the kettle to a point above the level of fat and below the level to which foam rises during frying operations, so that it also acts in the same way as the rim of inventor's prior application, above referred to, to prevent overflow of foam from the sides of the kettle.

Referring more particularly to the drawing, the kettle or pan, indicated at 10, is of conventional circular form and of relatively shallow thin sheet metal construction, and the circular rim 12 is removably supported in engagement with the bottom of the pan, with vertical sides parallel to the sides of the kettle to form an inner frying zone 14 and an outer storage channel 16 of undisturbed fat. The pan is provided with convenient handles 13 at either side. The rim is flared outwardly around its lower edge to fit substantially throughout the length of the joint between the vertical sides and horizontal bottom of the kettle, and to cause substantially all of the heat imparted to the bottom of the kettle to be transferred to the fat within the frying zone 14. The flared edge also holds the rim in uniform spaced relation to the sides of the kettle. The rim is so proportioned that there is between one-third and one-half as much fat in the storage channel 16 as in the frying zone 14. The fat within the channel 16, therefore, acts to store a quantity of heat which will assist materially in maintaining the fat in the frying zone at a cooking temperature when suddenly cooled by immersion of unheated food.

To permit the fat to flow into the channel 16 from the frying zone 14 when food is first immersed, and to cause more rapidly moving currents within the kettle when the level of fat is lowered at the end of the foaming period, the rim 12 is provided with a series of openings 18 at points below the fat level. When the food is first immersed, displacement of the food causes heated fat to flow through the openings into the storage channel 16 and, when the steam begins to be driven off, the level within the frying zone is raised higher, causing a further flow into the storage channel 16.

The amount of fat in the frying zone is thus decreased and, as the food becomes heated, the temperature of the fat in the frying zone is reduced. As the temperature of the fat is reduced, the amount of foam is correspondingly reduced, so that the foaming period is increased somewhat in length and made less violent. As soon as the foam reaches a maximum it begins to decrease, and the level of the fat in the frying zone to be lowered, permitting heated fat within the storage channel to flow through the openings 18 so that heat transferred through the bottom of the kettle is increased by the heat of the fat contained in the storage channel. The openings 18 being disposed at the level of the food being treated, cause heated currents of fat to be directed against the food, as indicated by the arrows 20 in Figure 1, thus avoiding the necessity for agitating the food.

The food to be fried is contained within a wire basket 22 of ordinary construction having cylindrical outer sides, shaped to fit closely with the inside of the rim 12. The bottom of the basket is arranged to rest directly on the bottom of the kettle, as shown in dot-dash lines in Figure 1, and the sides are held spaced from the inside surface of the rim by inwardly bulging surfaces of a rib 24 pressed into the rim at the level of the fat. The purpose of this rib is to provide an indication for the fat level in filling the kettle and also to prevent the food within the basket 22 from coming so close to the openings 20 that bubbles of steam thrown out during frying operations will not pass into the channel 16. The food basket 22 is so proportioned with relation to the rim 12 that when lifted from the fat, the upper edge of the rim 12 provides a stable support for the basket above the level of the fat, so that the food may drain readily. The position of the basket when so supported is clearly shown in Figure 1, and to improve the stability of the basket when so supported, the upper part of the kettle is flared outwardly somewhat.

The rim 12 is formed from a straight strip bent into a circular shape with its ends joined together, so as to provide a space 25 through which the fat may circulate. To secure the ends in spaced relation, the ends are riveted to the flanged portions of a vertical thermometer supporting sleeve 26, the upper edge of which is flush with the upper edge of the rim, and the lower edge is somewhat above the lower edge of the rim. The arrangement is such that when a thermometer, the main casing of which is indicated at 28, is supported within the sleeve 26, the temperature responsive portion will extend below the sleeve so that the temperature of the fat passing through the space 25 between the ends of the rim 12 may accurately be indicated.

A specially constructed thermometer is provided for use in the supporting sleeve of the type employing a temperature responsive element 30 composed of a bi-metallic strip extending below the main casing 28, the expansion or contraction of which strip causes movement of the indicating pointer 32 on one side of the casing. The fat is permitted to come into direct contact with the temperature responsive element which is shielded within a round tube 34 attached to the casing of the thermometer. The shielding tube 34 is of such a diameter as to fit loosely and rotatably within the sleeve 26 and is slotted at its lower end to expose the temperature responsive element 30.

the slotted portion of the tube extending below the lower edge of the sleeve 26. The round shielding tube 34 permits the thermometer to be turned readily in the supporting sleeve 26 so that the temperature may be observed conveniently from any desired angle.

In order to cause induced currents of fat flowing between the storage channel 16 and the frying zone to pass as close as possible to the heated bottom of the kettle, the form of rim shown in Figure 3 may be employed. With this construction, the lower edge of the rim is not only flared, but formed with scallops 36, the lower portions of which rest on the kettle bottom. The raised cut away edges between the scallops form restricted passages between the storage channel and the frying zone of the kettle and in other respects the rim is the same as the rim previously described.

When the kettle is to be cleaned after use, the rim 12 and the thermometer are removed together. The fat is then decanted by tipping the kettle over a suitable container. To insure that the heated fat will run out of the kettle in a solid stream clear of the outside surfaces, the upper part of the kettle is provided with an outwardly directed curved pouring flange 38 surrounding the entire circumference of the kettle. The outer edges of the flange 38 instead of being rolled back to form a bead, as is the usual arrangement in a thin sheet metal pan, are left relatively sharp and straight, as shown in Figure 1 so that the fat will leave without spattering or forming spray. The edge of the flange 38 thus is prevented from forming or collecting drops of fat during pouring so that the sides of the kettle will be kept dry after being set down.

The invention having been specifically described, what is claimed is:

1. Frying apparatus having, in combination, a kettle arranged to provide a frying zone within its central portion containing highly heated fat or oil of sufficient depth only to immerse a shallow layer of articles to be treated, and a rim around the frying zone extending from the level of the fat to the bottom of the kettle to form with the sides of the kettle a storage channel of sufficient capacity to assist materially in maintaining the fat in the frying zone at a cooking temperature when suddenly cooled by immersion of unheated food, and having openings below the fat level arranged to direct heated fat from the channel against the food being treated within the frying zone.

2. Frying apparatus having, in combination, a kettle arranged to provide a frying zone within its central portion containing highly heated fat or oil of sufficient depth only to immerse a shallow layer of articles to be treated, and a rim around the frying zone extending from the level of the fat to the bottom of the kettle to form with the sides of the kettle a storage channel of sufficient capacity to assist materially in maintaining the fat in the frying zone at a cooking temperature when suddenly cooled by immersion of unheated food, and having openings below the fat level between the channel and the frying zone of such size that flow of fat therethrough is restricted, to prevent sudden lowering of temperature within the channel when the food is first immersed.

3. Frying apparatus having, in combination, a kettle arranged to provide a frying zone within its central portion containing highly heated fat or oil of sufficient depth only to immerse a shallow layer of articles to be treated and a rim around the frying zone extending from the bottom of the kettle to a point above the level of the fat and below the level to which foam rises during normal frying operations, and having openings below the fat level arranged to direct heated fat from the channel towards the food being treated in the frying zone whenever the level of fat within the frying zone is lowered.

4. Frying apparatus having, in combination, a kettle arranged to provide a frying zone within its central portion containing highly heated fat or oil of sufficient depth only to immerse a shallow layer of articles to be treated, a rim around the frying zone extending from the level of the fat to the bottom of the kettle to form with the sides of the kettle a storage channel of sufficient capacity to assist materially in maintaining the fat in the frying zone at a cooking temperature when suddenly cooled by unheated food and having an opening below the fat level between the frying zone and the channel.

5. Frying apparatus having, in combination, a kettle arranged to provide a frying zone within its central portion containing highly heated fat or oil of sufficient depth only to immerse a shallow layer of articles to be treated, and a rim around the frying zone arranged with a flared lower edge to space the rim from the kettle sides and with scallops along the lower part of the flared edge, the lower portions of which rest on the kettle bottom to form passages between the storage channel and the frying zone of the kettle.

6. Frying apparatus having in combination, an open kettle having a substantially horizontal bottom and vertical sides arranged to provide a frying zone containing highly heated fat or oil, and a rim in the kettle arranged with an outwardly flared lower edge fitting the joint between the kettle bottom and sides to direct heated fat rising from substantially the entire bottom inwardly towards the center of the frying zone.

7. Frying apparatus having, in combination, an open kettle arranged to provide a frying zone containing highly heated fat or oil within a substantial proportion of its inner volume, a rim comprising a vertical strip disposed in spaced relation to the sides of the kettle to form a storage channel around the frying zone, and a thermometer supporting sleeve secured to the ends of the strip for holding the ends spaced from each other with the bottom edge of the sleeve at a distance above the lower edge of the strip to ensure exposure of the temperature responsive element of a thermometer supported below the sleeve to the fat passing between the ends of the strip.

8. Frying apparatus having, in combination, a kettle arranged to provide a frying zone within its central portion containing highly heated fat or oil of sufficient depth only to immerse a shallow layer of articles to be treated, a food basket shaped to fit within the frying zone and a rim extending from the level of the fat to the bottom of the kettle to form with the sides of the kettle a storage channel of sufficient capacity to assist materially in maintaining the fat in the frying zone at a cooking temperature when suddenly cooled by immersion of unheated food and having openings below the fat level, and inwardly projecting means above the openings for spacing the basket sufficiently from the openings to prevent foam rising from food in the basket from passing into the storage channel.

9. Frying apparatus having, in combination, an open kettle, and a foam controlling rim in the kettle arranged to provide a channel of predetermined width between the rim and the kettle sides and with an inwardly bulging rib on the rim for indicating the level to which the kettle may be filled with fat or oil to cause the most efficient circulation of heated fat during cooking.

10. Frying apparatus having, in combination, a round open kettle arranged to provide a frying zone containing highly heated fat or oil within a substantial proportion of its inner volume, a food basket having cylindrical outer sides, a circular rim within the kettle with its upper edge relatively lower than the edges of the kettle to form a storage channel surrounding the frying zone and to act as a stable support for the food basket above the level of the fat.

11. Frying apparatus having, in combination, an open kettle arranged to provide a frying zone containing highly heated fat or oil within a substantial proportion of its inner volume, and thermometer supporting means comprising a member removably fitting the joint between the bottom and sides at opposite sides of the kettle to hold the supporting means in fixed relation to the kettle sides.

12. Frying apparatus having, in combination, an open kettle arranged to provide a frying zone containing highly heated fat or oil within a substantial proportion of its inner volume, a rim comprising a strip of material bent into the shape of the kettle with its ends spaced, and a thermometer supporting sleeve having flanged portions attached to the ends of the rim and arranged to hold a thermometer in the space between the ends of the rim.

KENNETH L. CHILDS.